United States Patent
Song et al.

(10) Patent No.: US 10,989,540 B2
(45) Date of Patent: Apr. 27, 2021

(54) BINOCULAR VISION LOCALIZATION METHOD, DEVICE AND SYSTEM

(71) Applicant: GOERTEK INC., Shandong (CN)

(72) Inventors: Haoran Song, Weifang (CN); Tianrong Dai, Weifang (CN); Yuchuan Ren, Weifang (CN); Shunming Li, Weifang (CN); Jinxi Cao, Weifang (CN)

(73) Assignee: GOERTEK INC., Shandong (CN)

( * ) Notice: Subject to any disclaimer, the term of this patent is extended or adjusted under 35 U.S.C. 154(b) by 271 days.

(21) Appl. No.: 16/302,024

(22) PCT Filed: Jul. 18, 2018

(86) PCT No.: PCT/CN2018/096185
§ 371 (c)(1),
(2) Date: Nov. 19, 2018

(87) PCT Pub. No.: WO2019/062291
PCT Pub. Date: Apr. 4, 2019

(65) Prior Publication Data
US 2019/0204084 A1    Jul. 4, 2019

(30) Foreign Application Priority Data
Sep. 29, 2017 (CN) .......................... 201710908182.6

(51) Int. Cl.
*G01C 21/18* (2006.01)
*G05D 1/02* (2020.01)
(Continued)

(52) U.S. Cl.
CPC .......... *G01C 21/18* (2013.01); *G01C 21/005* (2013.01); *G01C 21/165* (2013.01); *G01C 21/20* (2013.01); *G05D 1/02* (2013.01)

(58) Field of Classification Search
CPC .... G01C 21/18; G01C 21/165; G01C 21/005; G01C 21/20; G05D 1/02;
(Continued)

(56) References Cited

U.S. PATENT DOCUMENTS 9,870,624 B1 * 1/2018 Narang ................... G06T 7/55
10,360,686 B2 * 7/2019 Wang ..................... G06T 7/207
(Continued)

FOREIGN PATENT DOCUMENTS

CN    102109348 A    6/2011
CN    103345751 A    10/2013
(Continued)

*Primary Examiner* — Michael V Kerrigan
(74) *Attorney, Agent, or Firm* — Maschoff Brennan (57) ABSTRACT

A binocular vision localization method, device and system are provided. The method includes calculating first pose change information according to two frames of images collected by a binocular camera unit at two consecutive moments and calculating second pose change information according to inertia parameters collected by an inertial measurement unit between the two consecutive moments. Matched feature points in the two frames are extracted from the two frames respectively. A reprojection error of each feature point is calculated. The calculations are taken as nodes or edges of a general graph optimization algorithm to acquire optimized third pose change information for localization. The system includes a binocular vision localization device, and a binocular camera unit and an inertial measurement unit respectively connected thereto, a left-eye camera and a right-eye camera are symmetrically located on two sides of the inertial measurement unit. This can improve accuracy and real-time performance for pose estimation.

20 Claims, 3 Drawing Sheets

(51) Int. Cl.
*G01C 21/00* (2006.01)
*G01C 21/20* (2006.01)
*G01C 21/16* (2006.01)

(58) Field of Classification Search
CPC . G06T 2207/10021; G06T 2207/20072; G06T 2207/30244; G06T 7/579; G06T 7/593
See application file for complete search history.

(56) References Cited

U.S. PATENT DOCUMENTS

| | | | |
|---|---|---|---|
| 10,552,979 B2* | 2/2020 | Zhu | G06T 7/74 |
| 10,671,083 B2* | 6/2020 | Zhu | G06T 7/269 |
| 2010/0315412 A1* | 12/2010 | Sinha | G06T 15/00 |
| | | | 345/419 |
| 2019/0130216 A1* | 5/2019 | Tomioka | G06K 9/6267 |

FOREIGN PATENT DOCUMENTS

| | | |
|---|---|---|
| CN | 106052683 A | 10/2016 |
| CN | 106708066 A | 5/2017 |
| CN | 107085422 A | 8/2017 |
| CN | 107193279 A | 9/2017 |
| CN | 107747941 A | 3/2018 |

\* cited by examiner

BINOCULAR VISION LOCALIZATION METHOD, DEVICE AND SYSTEM

CROSS REFERENCE

This application claims priority to Chinese Patent Application No. 201710908182.6 entitled "Binocular Vision Localization Method, Device and System" filed on Sep. 29, 2017, the entire content of which is incorporated herein by reference.

TECHNICAL FIELD

The present disclosure relates to the technical field of localization, and more particularly to a binocular vision localization method, a device and a system.

BACKGROUND

Simultaneous Localization And Mapping (SLAM) technology is an important technology in the field of robots. At present, this technology has been widely applied to the fields of mobile robots, unmanned aerial vehicles, virtual reality, augmented reality, etc.

Currently, the SLAM technology is divided into two parts: front-end and rear-end. The front-end part mainly involves collection of sensor information, and the rear-end part mainly involves processing of the sensor information, including position and posture calculation, position and posture optimization, loop closure detection, mapping, and the like. At present, a camera is mainly used to collect information in SLAM. However, the camera is easily affected by the environments (such as lights, white walls, desktops and etc.), making it impossible to perform the pose estimation. Moreover, the rear-end data processing algorithms currently used in SLAM can hardly satisfying application scenarios with high requirements on real-time performance.

Thus, the existing space localization and mapping methods not only have low accuracy in pose estimation, but also have poor real-time performance.

SUMMARY

Embodiments of the present disclosure provide a binocular vision localization method, device and system with the purpose of improving the accuracy and the real-time performance for pose estimation.

There is provided a binocular vision localization method in an embodiment of the present disclosure. The method comprises: calculating first pose change information according to two frames of images collected by a binocular camera unit at two consecutive moments; calculating second pose change information according to inertial parameters collected by an inertial measurement unit on the binocular camera unit between the two consecutive moments; extracting feature points that are matched in the two frames of images from the two frames of images respectively, and calculating a reprojection error of each of the feature points; and acquiring third pose change information for localization via an optimization calculation of a general graph optimization algorithm with the first pose change information and the feature points that are matched in the two frames of images as nodes of the general graph optimization algorithm, and a difference between the first pose change information and the second pose change information and the reprojection error of each of the feature points as edges of the general graph optimization algorithm.

There is provided a binocular vision localization device in another embodiment of the present disclosure. The device comprises: a first calculation module configured to calculate first pose change information according to two frames of images collected by a binocular camera unit at two consecutive moments; a second calculation module configured to calculate second pose change information according to inertial parameters collected by an inertial measurement unit on the binocular camera unit between the two consecutive moments; a third calculation module configured to extract feature points that are matched in the two frames of images from the two frames of images, respectively, and calculate a reprojection error of each of the feature points; and a localization module configured to acquire third pose change information for localization via an optimization calculation of a general graph optimization algorithm with the first pose change information and the feature points that are matched in the two frames of images as nodes of the general graph optimization algorithm, and a difference between the first pose change information and the second pose change information and the reprojection error of each of the feature points as edges of the general graph optimization algorithm.

There is also provided a binocular vision localization system in another embodiment of the present disclosure. The system comprises: a binocular camera unit, an inertial measurement unit, and the above binocular vision localization device. The binocular camera unit comprises a left-eye camera and a right-eye camera. The inertial measurement unit is disposed on the binocular camera unit, and the left-eye camera and the right-eye camera are symmetrically located on two sides of the inertial measurement unit. In addition, the binocular camera unit and the inertial measurement unit are connected to the device for binocular vision localization, respectively.

In the technical solutions provided by the embodiments of the present disclosure, the binocular camera unit and the inertial measurement unit are combined to perform pose estimation, and the inertial measurement unit is introduced to reduce errors of pose estimation only depending on the binocular camera unit. Moreover, when the binocular camera unit moves violently, or when the binocular camera unit is affected by ambient noise, or when the binocular camera unit is located in a region with less texture feature, pose estimation can also be performed based on data collected by the inertial measurement unit, thereby significantly improving the stability, and avoiding the problems of impossible pose estimation and the like due to the binocular camera unit being affected by the environment. In addition, the general graph optimization algorithm is employed to optimize the pose estimation, which effectively reduces the data processing time and improves the real-time performance.

BRIEF DESCRIPTION OF THE DRAWINGS

To more clearly illustrate the technical solutions in the embodiments of the present disclosure or the prior art, drawings required in the descriptions of the embodiments or the prior art are introduced below briefly. It is apparent that the drawings in the following descriptions are some embodiments of the present disclosure. For those of ordinary skill in the art, it would be possible to derive other drawings based on such drawings without creative work.

DETAILED DESCRIPTION OF THE INVENTION

To allow those skilled in the art to better understand the solutions of the present disclosure, the technical solutions in the embodiments of the present disclosure will be clearly and completely described below in combination with the accompanying drawings in the embodiments of the present disclosure.

A plurality of operations in a particular order are included in some processes described in the description, claims, and the above drawings of the present disclosure, and such operations may be executed not in the order in which they are presented herein, or may be executed concurrently. The serial numbers of operations, such as 101, 102 and the like, are merely intended to distinguish different operations, and the serial numbers themselves do not indicate any execution order. Additionally, such processes may include more or less operations, and these operations may be executed in order or concurrently. It should be noted that the terms "first", "second" and the like herein are intended to distinguish different messages, devices, modules, etc., which may not indicate any sequence and may not define "first" and "second" as different types.

The technical solutions in the embodiments of the present disclosure will be clearly and completely below in combination with the accompanying drawings in the embodiments of the present disclosure. It is apparent that the described embodiments are merely part of, rather than all, the embodiments of the present disclosure. All other embodiments derived by those skilled in the art based on the embodiments in the present disclosure without creative work shall fall within the protection scope of the present disclosure.

Figure 1:
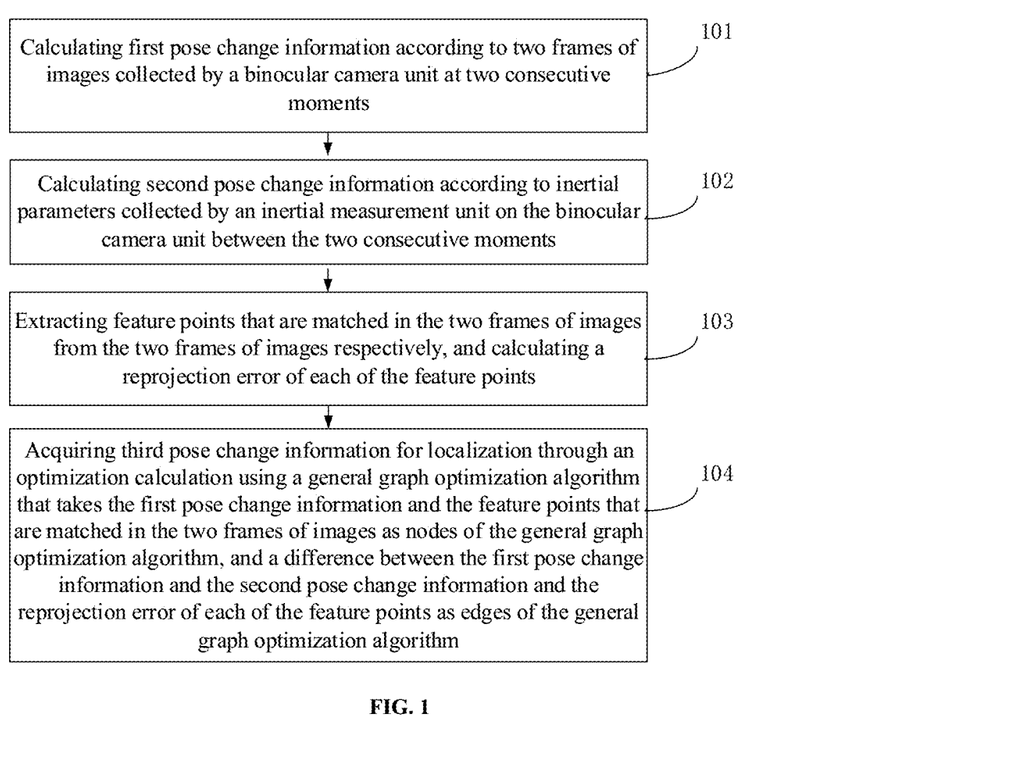
FIG. 1 is a flow diagram of a binocular vision localization method provided by an embodiment of the present disclosure.

FIG. 1 is a flow diagram of a binocular vision localization method provided by an embodiment of the present disclosure. The method comprises the following steps.

In step 101, first pose change information is calculated according to two frames of images collected by a binocular camera unit at two consecutive moments.

In step 102, second pose change information is calculated according to inertial parameters collected by an inertial measurement unit on the binocular camera unit between the two consecutive moments.

In step 103, feature points that are matched in the two frames of images are extracted from the two frames of images, respectively, and a reprojection error of each of the feature points is calculated.

In step 104, third pose change information for localization is acquired via an optimization calculation of a general graph optimization algorithm with the first pose change information and the feature points that are matched in the two frames of images as nodes of the general graph optimization algorithm, and a difference between the first pose change information and the second pose change information and the reprojection error of each of the feature points as edges of the general graph optimization algorithm.

In the above step 101, feature points in the two frames of images may be extracted and matched, and then the first pose change information may be determined based on the coordinate information of the feature points in the two frames of images. Exemplarily, a plurality of previous-frame feature points are extracted from a previous frame of the two frames of images. The coordinate information of the plurality of previous-frame feature points is acquired. A plurality of next-frame feature points that are respectively matched with the plurality of previous-frame feature points are searched from a next frame of the two frames of images, The coordinate information of the plurality of next-frame feature points is acquired. Then, a rotation transform matrix and a displacement change vector of the binocular camera unit are calculated according to the coordinate information of the plurality of previous-frame feature points and the coordinate information of the plurality of next-frame feature points to acquire the first pose change information.

In practical application, feature points between two frames of images may be matched and extracted by using Scale-Invariant Feature Transform (SIFT) algorithm or Speeded-Up Robust Features (SURF) algorithm. Preferably, the feature points used in the embodiments may be Oriented FAST and Rotated BRIEF (ORB) feature points. The ORB feature points are improved feature points for FAST features and BRIEF descriptors, and have high efficiency and rotational invariance when compared with other feature points. A plurality of previous-frame feature points can be extracted from the previous frame, and then next-frame feature points that are respectively matched with the plurality of previous-frame feature points are extracted from the next frame, thereby acquiring a plurality of next-frame feature points. The coordinate information of the plurality of previous-frame feature points may be a three-dimensional coordinate in a reference coordinate system (e.g., a world coordinate system) or a two-dimensional coordinate in an image plane coordinate system. Generally, according to the two-dimensional coordinate (i.e., two-dimensional coordinate in image plane coordinate system) of the feature point in a right-eye image and a left-eye image in a certain frame, the three-dimensional coordinate of a feature point in the reference coordinate system can be reproduced by using a triangulation reconstruction method. The coordinate information of the next-frame feature points may be a two-dimensional coordinate in the image plane coordinate system or a three-dimensional coordinate in the reference coordinate system. A projection matrix can be determined according to the coordinate information of the plurality of previous-frame feature points and the coordinate information of the plurality of next-frame feature points, and the rotation transform matrix and the displacement change vector of the binocular camera unit can be determined according to the projection matrix. That is, the first pose change information can be determined. The projection coordinate acquired by projecting the three-dimensional coordinate of a previous-frame feature point in the reference coordinate system into the image plane of a next frame using the projection matrix may have a minimum error with the two-dimensional coordinate of a next-frame feature point matched with the previous-frame feature point in the image plane coordinate system.

In a possible implementation, when the coordinate information of the plurality of previous-frame feature points is the three-dimensional coordinates of the plurality of previous-frame feature points in the reference coordinate system, the coordinate information of the plurality of previous-frame feature points may be acquired by the following method: acquiring two-dimensional coordinates of the plurality of previous-frame feature points in the left-eye image and the right-eye image of the previous frame; calculating depth information of the plurality of previous-frame feature points according to the two-dimensional coordinates of the plurality of previous-frame feature points, a focal length of the binocular camera unit and a baseline of the binocular camera unit; and acquiring the three-dimensional coordinates of the plurality of previous-frame feature points according to the two-dimensional coordinates and the depth information of the plurality of previous-frame feature points in the left-eye image and the right-eye image of the previous frame.

Herein, the binocular camera unit mentioned comprises a left-eye camera and a right-eye camera. The left-eye image is captured by the left-eye camera, and the right-eye image is captured by the right-eye camera. A parallax may be calculated according to the left-eye image and the right-eye image, and the depth information of the feature points can be acquired based on the parallax. For example, regarding a space point P, two pixel points (i.e., the feature points) thereof may be generated respectively on the left and right cameras, denoted by $P_L$ and $P_R$, and the two-dimensional coordinates of the two in a pixel coordinate system are $U_L$ and $U_R$, respectively. The baseline of a binocular camera is b and the focal length of the binocular camera is f, then the depth z of the space point P may be calculated by the following equations:

$$d = U_L - U_R \quad (1)$$

$$z = \frac{fb}{d} \quad (2)$$

Where, d represents the parallax of images captured by the left and right cameras. The depth information Z of the space point P may be calculated by using the equation (2). In general, the greater the parallax, the farther the spatial depth that can be estimated, and the smaller the parallax, the closer the spatial depth that can be estimated.

After the depth information is acquired, the three-dimensional coordinates of the plurality of previous-frame feature points in a camera coordinate system may be directly determined based on the depth information and the two-dimensional coordinates of the plurality of previous-frame feature points in the image plane coordinate system. According to the pose state information of the binocular camera unit at a previous moment of two consecutive moments, the three-dimensional coordinates in the camera coordinate system can be transformed into the three-dimensional coordinates in the reference coordinate system through coordinate transformation.

In the above step 102, the inertial measurement unit is a device configured to measure a three-axis attitude angle (or angular velocity) and an acceleration of an object. Generally, the inertial measurement unit may collect inertial parameters continuously. The inertial parameters captured by the inertial measurement unit between the two consecutive moments can be acquired and integrated in time, so as to acquire the second pose change information.

It should be noted here that the frame rate of image acquisition of the binocular camera unit is generally 20 Hz to 60 Hz, and the rate of collecting accelerations and angular velocities by the inertial measurement unit may be up to 1000 Hz. If all angular velocities and accelerations collected by the inertial measurement unit are input into the general graph optimization algorithm for calculation, it will lead to too many nodes and excessive calculation amount. Pre-integration can allow for the integration of inertial measurement information (angular velocities and accelerations) between two frames or any frames, so as to acquire a constant which can be used as a motion constraint between two frames, thereby significantly reducing node information and lowering the calculation burden. Information such as angular velocities, speeds, positions and the like may be acquired through pre-integration on manifold to serve as constraints between the poses of the binocular camera unit at two moments in the motion process, which are shown as below:

$$R_{WB}^{i+1} = R_{WB}^i \Delta R_{i,i+1} \mathrm{Exp}((J_{\Delta R}^g b_g^i))$$

$$wP_B^{i+1} = wP_B^i + wV_B^i \Delta t_{i,i+1} + \frac{1}{2} g_w \Delta t_{i,i+1}^2 + R_{WB}^i (\Delta P_{i,i+1} + J_{\Delta p}^g b_g^i + J_{\Delta p}^a b_a^i)$$

$$wV_B^{i+1} = wV_B^i + g_w \Delta t_{i,i+1} + R_{WB}^i (\Delta V_{i,i+1} + J_{\Delta v}^g b_g^i + J_{\Delta v}^g b_a^i)$$

Where, w and WB both denote angular velocities; $R_{WB}^i$ denotes a rotation matrix in the world coordinate system under state i; $R_{WB}^{i+1}$ denotes a rotation matrix in the world coordinate system under state i+1; $J_{\Delta R}^g$ denotes Jacobian matrix of g with respect to $\Delta R$; $\Delta R_{i,i+1}$ denotes a rotation difference from the i-th moment to the (i+1)-th moment; $b_g^i$ denotes a bias of the gravitational acceleration under state i; $wP_B^i$ denotes a displacement vector in world coordinate system under state i; $wP_B^{i+1}$ denotes a displacement vector in the world coordinate system under state i+1; $wV_B^i$ denotes a velocity vector in the world coordinate system under state i; $\Delta t_{i,i+1}$ denotes a time difference from the i-th moment to the (i+1)-th moment; $g_w$ and g both denote the gravitational acceleration; $\Delta P_{i,i+1}$ denotes a displacement difference from the i-th moment to the (i+1)-th moment; $J_{\Delta p}^g$ denotes hte Jacobian matrix of g with respect to $\Delta p$; $b_a^i$ denotes a bias of an acceleration under state i; $wV_B^i$ denotes a velocity vector in the world coordinate system under state i+1; $wV_B^i$ denotes a velocity vector in the world coordinate system under state i; $\Delta V_{i,i+1}$ denotes a velocity difference from the i-th moment to the (i+1)-th moment; $J_{\Delta v}^g$ denotes the Jacobian matrix of g with respect to $\Delta v$; and $J_{\Delta p}^a$ denotes the Jacobian matrix of a with respect to $\Delta p$.

In an implementable solution, in the above step 102, the second pose change information is calculated according to inertial parameters collected by the inertial measurement unit on the binocular camera unit between the two consecutive moments, which may exemplarily comprise: acquiring the second pose change information by performing pre-integration on manifold on the inertial parameters collected by the inertial measurement unit between the two consecutive moments. Exemplarily, the inertial measurement unit comprises a three-axis acceleration sensor and a gyroscope, and the inertial parameters include the angular velocity and the acceleration. The step of acquiring the second pose change information by performing pre-integration on manifold on the inertial parameters collected by the inertial measurement unit between the two consecutive moments may be exemplarily implemented in the following way: performing pre-integration on manifold on the angular velocity collected by the inertial measurement unit between the two consecutive moments to acquire the rotation transform matrix of the inertial measurement unit; and performing pre-integration on manifold on the accelerations collected by the inertial measurement unit between the two consecutive moments to acquire the displacement change vector of the inertial measurement unit, wherein the second pose change information comprises: the rotation transform matrix of the inertial measurement unit and the displacement change vector of the inertial measurement unit.

In the above step 103, the reprojection error of a feature point refers to an error between a projection point acquired by using the above-mentioned projection matrix and a measurement point on an image. That is, an error between projection coordinates acquired by projecting the three-dimensional coordinates of a previous-frame feature point in the reference coordinate system into the image plane of a next frame using the projection matrix and the two-dimensional coordinates of a next-frame feature point matched with the previous-frame feature point in the image plane coordinate system is the reprojection error of the previous-frame feature point.

In the above step 104, the first pose information, the second pose information and the three-dimensional coordinates of the feature points in the reference coordinate system may be optimized by using the General Graph Optimization (G2O) algorithm. Before optimization using the G2O, it is required to define nodes and edges therein: the first pose change information of the binocular camera unit and the feature points that are matched in two frames of images are taken as the nodes of the general graph optimization algorithm, and a difference between the first pose change information and the second pose change information and the reprojection error of each of the feature points are taken as the edges of the general graph optimization algorithm; then, optimization calculation is performed on the nodes and the edges by using the general graph optimization algorithm to acquire the pose information for localization.

Exemplarily, the first pose change information of the binocular camera unit is taken as a first pose node of the general graph optimization algorithm; the coordinates of the feature points in the two frames of images are taken as a plurality of first landmark nodes in the general graph optimization algorithm; the reprojection errors of a plurality of previous-frame feature points are taken as first edges respectively connecting the first pose node to the plurality of first landmark nodes; the difference between the first pose change information and the second pose change information is taken as a second edge connecting the first pose node and a second pose node; and the first pose node, the plurality of first landmark nodes, the first edges respectively connecting the first pose node to the plurality of first landmark nodes, and the second edge are taken as inputs for optimization calculation by the general graph optimization algorithm, thereby acquiring the third pose change information for localization and the position information of the matched feature points in the two frames.

The above first pose change information comprises a first rotation transform matrix Rc and a first displacement change matrix Tc, and the second pose change information comprises a second rotation transform matrix Ri and a second displacement change matrix Ti. The difference $e_{se3}$ between the first pose change information and the second pose change information may be represented by the following equation:

$$e_{se3} = \begin{bmatrix} Rc & Tc \\ 0 & 1 \end{bmatrix} - \begin{bmatrix} Ri & Ti \\ 0 & 1 \end{bmatrix}$$

In the technical solutions provided by the embodiments of the present disclosure, the binocular camera unit and the inertial measurement unit are combined to perform pose estimation, and the inertial measurement unit is introduced to reduce errors of pose estimation only depending on the binocular camera unit. Moreover, when the binocular camera unit moves violently, or when the binocular camera unit is affected by ambient noise, or when the binocular camera unit is located in a region with less texture feature, pose estimation can also be performed based on data collected by the inertial measurement unit, thereby significantly improving the stability, and avoiding the problems of impossible pose estimation and the like due to the binocular camera unit being affected by the environment. In addition, the general graph optimization algorithm is employed to optimize the pose estimation, which effectively reduces the data processing time and improves the real-time performance.

It should be noted that after the third pose change information, the pose information of the binocular camera unit at the previous moment of two consecutive moments may be acquired, and then the pose information of the binocular camera unit at the next moment can be acquired based on the pose information at the previous moment and the optimized pose change information. Exemplarily, the pose information of the binocular camera unit at the previous moment of two moments may be taken as initial pose information by default, and then the pose information at the next moment of the two moments can be acquired based on the third pose change information acquired through the above calculations and the initial pose information. The above case where the pose information at the previous moment of two moments is defaulted to the initial pose information applies to a case that the binocular camera unit is just started up. If the two moments are later than the startup of the binocular camera unit, it is required to push forward the time axis in the direction earlier than the two moments, and then the pose information of the binocular camera unit at the startup T0 may be defaulted to the initial pose information. Based on the above pose change calculation method, pose change information (i.e., the optimized pose change information) at next frame T1 relative to the startup T0 can be calculated. Subsequently, the pose information of the binocular camera unit at the next frame T1 can be calculated based on the pose change information and the initial pose information. With the pose information of the binocular camera unit at T1, the pose information of the binocular camera unit at T2 may be further acquired according to the above calculation process. Through continuous calculation in such a manner, the pose information of the binocular camera unit determined by using the above binocular vision localization algorithm at each moment can be acquired, so that the binocular camera unit can be localized accurately.

Further, in the above step 104, the position information of the matched feature points in the two frames may also be acquired while the third pose change information for localization is acquired from the optimization calculation using the general graph optimization algorithm that takes the first pose change information and the feature points that are matched in the two frames as the nodes of the general graph optimization algorithm, and the difference between the first pose change information and the second pose change information and the reprojection error of each feature point as the edges of the general graph optimization algorithm. Correspondingly, the binocular vision localization method may also comprise: building an environment map based on the position information of the matched feature points in the two frames of images.

Figure 2:
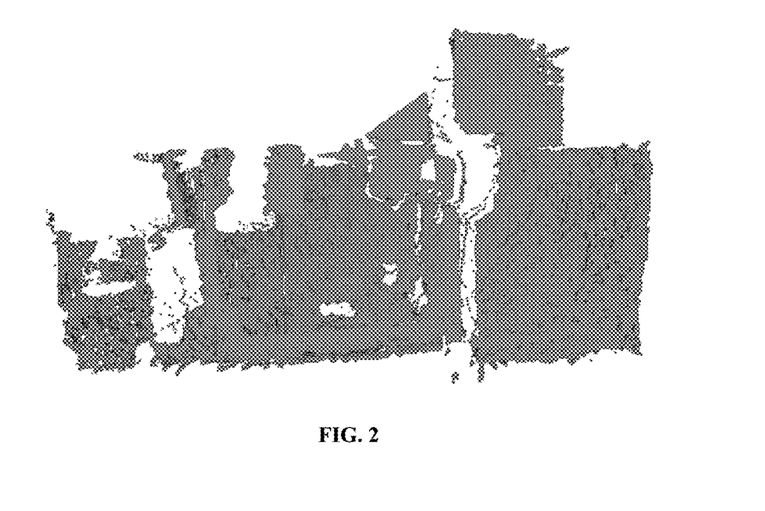
FIG. 2 is an exemplary local environment map built based on position information of a plurality of feature points calculated by a binocular vision localization method provided by an embodiment of the present disclosure.

Herein, there may be a plurality of matched feature points in the two frames acquired through the above calculation, such as 100,000 or 200,000. In practical application, the more the feature points, the more detailed the environment map built subsequently based on such feature points. The above position information of the matched feature points in the two frames may serve as a local map of the ambient environment. For example, FIG. 2 illustrates a sparse environment map composed of 200,000 feature points. Here, the position information of the feature points acquired through the optimization calculation using the general graph optimization algorithm may be the three-dimensional coordinates of the feature points in the reference coordinate system.

Figure 3:
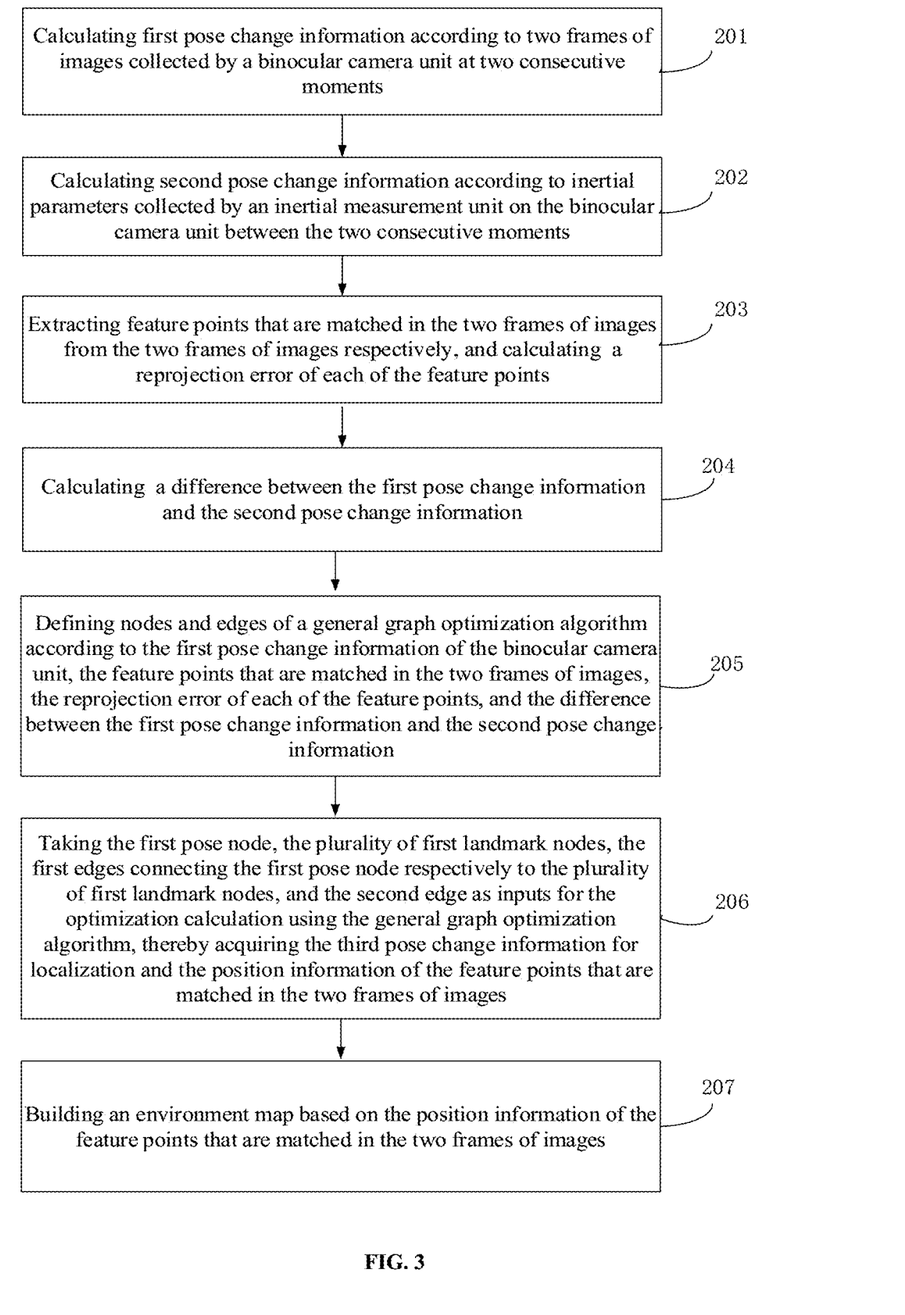
FIG. 3 is a flow diagram of a binocular vision localization method provided by another embodiment of the present disclosure.

FIG. 3 is a flow diagram of a binocular vision localization method provided by another embodiment of the present disclosure. The method comprises the following steps.

At step 201, first pose change information is calculated according to two frames of images collected by a binocular camera unit at two consecutive moments.

At step 202, second pose change information is calculated according to inertial parameters collected by an inertial measurement unit on the binocular camera unit between the two consecutive moments.

At step 203, feature points that are matched in the two frames of images are extracted from the two frames of images respectively, and a reprojection error of each of the feature points is calculated.

At step 204, a difference between the first pose change information and the second pose change information is calculated.

At step 205, nodes and edges of a general graph optimization algorithm are defined according to the first pose change information of the binocular camera unit, the feature points that are matched in the two frames of images, the reprojection error of each of the feature points, and the difference between the first pose change information and the second pose change information.

Exemplarily, the above process of defining the nodes and the edges of the general graph optimization algorithm comprises the following steps.

At step 2051, the first pose change information of the binocular camera unit is taken as a first pose node in the general graph optimization algorithm.

At step 2052, the coordinates of the feature points in the two frames are taken as a plurality of first landmark nodes in the general graph optimization algorithm.

At step 2053, the reprojection errors of a plurality of previous-frame feature points are taken as first edges connecting the first pose node respectively to the plurality of first landmark nodes.

At step 2054, the difference between the first pose change information and the second pose change information is taken as a second edge connecting the first pose node and a second pose node.

At step 206, the first pose node, the plurality of first landmark nodes, the first edges connecting the first pose node respectively to the plurality of first landmark nodes, and the second edge are taken as inputs for the optimization calculation using the general graph optimization algorithm, thereby acquiring the third pose change information for localization and the position information of the feature points that are matched in the two frames of images.

At step 207, an environment map is built based on the position information of the feature points that are matched in the two frames of images.

The above steps 201-204 may be referred to corresponding description in the above embodiments and will not be redundantly described herein.

Figure 4:
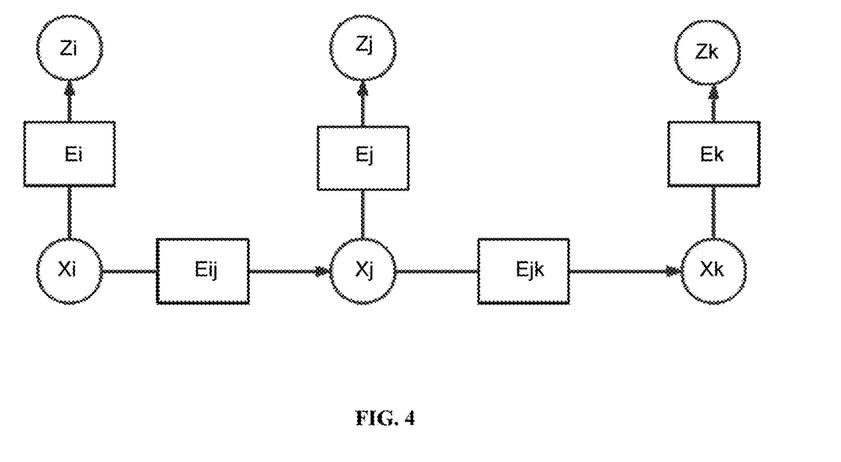
FIG. 4 is a schematic diagram of a graphic architecture of general graph optimization employed in a binocular vision localization method provided by another embodiment of the present disclosure.

In the above step 205, General Graph Optimization (G2O) has a variety of solvers, and also a variety of types of nodes and edges. By customizing nodes and edges, an optimization problem can be expressed into a graph which can be solved by using G2O. In the solution provided by the present embodiment, the nodes and the edges are defined in the definition manners shown in the above steps 2051-2054, then the localization optimization problem can be expressed into a graph as shown in FIG. 4, so as to be solved by using the G2O. Here, it needs to be noted that FIG. 4 merely illustrates a part of the graph, rather than the full graph of the present embodiment. Due to a large number of matched feature points in two frames, each feature point serves as a landmark node in the graph, which cannot be completely shown in FIG. 4. Referring to FIG. 4, $Z_i$, $Z_j$ and $Z_k$ are landmark nodes, i.e., the three-dimensional coordinates of a particular feature point in an image; $X_i$, $x_j$ and $X_k$ are pose nodes, i.e., the first pose change information (comprising a rotation matrix R and a displacement matrix T) of the binocular camera unit at two consecutive moments; $E_i$, $E_j$ and $E_k$ are edges between the landmark nodes and the pose nodes, i.e., the reprojection error of the three-dimensional coordinate of feature point $Z_i$, the reprojection error of the three-dimensional coordinate of feature point $Z_j$, and the reprojection error of the three-dimensional coordinate of feature point $Z_k$; $E_{ij}$ and $E_{jk}$ are pose errors between poses, i.e., the difference between first pose change information calculated from two frames captured by the binocular camera unit at two consecutive moments and the second pose change information calculated from inertial parameters captured by the inertial measurement unit between the two consecutive moments.

In the above step 207, for example, the landmark nodes are expressed by g2o::VertexSE3Expmap provided in G2O, that is the above first landmark nodes; the pose nodes are expressed by g2o::VertexSE3 provided in G2O, and the first edges may be expressed by g2o::EdgeSE3ProjectXYZ provided in G2O, i.e., the first edges connecting the first pose node respectively to a plurality of first landmark nodes; and the second edge may be expressed by g2o::EdgeSE3 provided in G2O, i.e., the difference between the first pose change information and the second pose change information.

It should be noted that a problem to be solved is represented by a graph upon the initialization of G2O. During the optimization process of G2O, Levenberg-Marquardt (LM) algorithm is employed to perform iterative calculation. The LM algorithm is an improvement and optimization of Gauss-Newton method, which is rapid in convergence and has a constantly adjusted step-size.

In the embodiments described above or below, the above method further comprises: if no next-frame feature point matched with each previous-frame feature point is found from the next frame of the two frames of images, outputting the second pose change information as the third pose change information for localization, until a next-frame feature point that is matched with each previous-frame feature point is acquired found the next frame of the two frames of images.

If no next-frame feature point matched with each previous-frame feature point is found from the next frame of the two frames of images, it indicates that the pose estimation cannot be achieved by means of the binocular camera unit. Therefore, the information collected by the inertial measurement unit may be used as a unique basis for pose estimation, and re-localization is tried with the data collected by the binocular camera unit. If the re-localization is successful, tracking is performed according to the binocular camera unit and the inertial measurement unit. If the re-localization is failed, localization is continuely performed according to the inertial measurement unit. It thus can be seen that according to the technical solutions provided by the embodiments of the present disclosure, when the binocular camera unit moves violently, or when the binocular camera unit is affected by ambient noise, or when the binocular camera unit is located in a region with less feature texture, pose estimation may also be performed based on data captured by the inertial measurement unit; thus, the stability can be significantly improved, and the problems of impossible pose estimation and the like due to the binocular camera unit being affected by the environment can be avoided.

Figure 5:
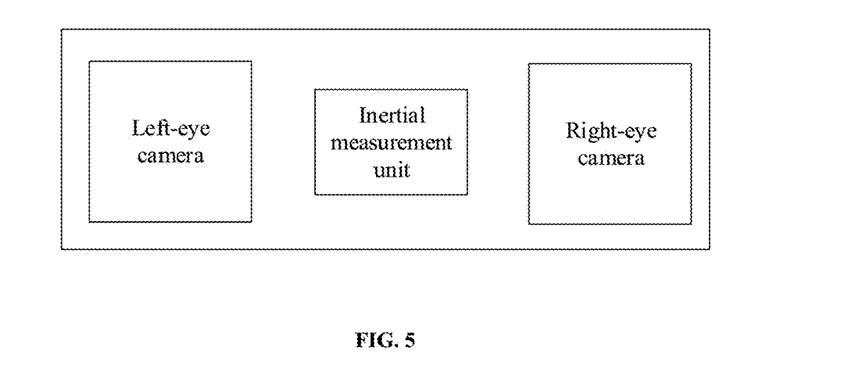
FIG. 5 is a schematic diagram of structures of a binocular camera unit and an inertial measurement unit provided by an embodiment of the present disclosure.

It should be noted that since the coordinate system on the binocular camera unit and the coordinate system on the inertial measurement unit are not completely identical, and there is a certain deviation between the two in data capturing time. Therefore, joint calibration of the binocular camera unit and the inertial measurement unit is required before implementing the methods in the above embodiments, so as to acquire a transformation relationship between the coordinate systems of the inertial measurement unit and the camera coordinate system, as well as a difference between incoming time of an image and incoming time of inertial data. For example, the binocular camera unit is a binocular camera and comprises a left-eye camera and a right-eye camera. The inertial measurement unit is disposed in a central position of the line connecting the left-eye camera and the right-eye camera, as shown in FIG. 5. By such joint calibration, an optimum association relationship in space and time can be acquired, which may be very helpful for improving the accuracy of pose estimation. One objective of the joint calibration is to acquire the following information: a transformation relationship between the coordinate system of the binocular camera unit (comprising the left-eye camera and the right-eye camera) and the coordinate system of the inertial measurement unit; a deviation between the time of the binocular camera unit and the time of the inertial measurement unit, and the like. Unlike single calibration (such as a method of calibrating only the binocular camera unit), the joint calibration performs uniform calibration on the binocular camera unit and the inertial measurement unit to acquire calibrated coordinates, calibrated time and the like on the overall system, thereby facilitating both the binocular camera unit and the inertial measurement unit to use the same calibrated time and the same calibrated coordinate system for localization, so as to acquire more accurate localization information.

Further, the following information may be required in the joint calibration process: 1, the direction of gravity in an inertial coordinate system, expressed as $g_w$; 2, a transform matric from the coordinate system of the binocular camera unit to the coordinate system of the inertial measurement unit, expressed as $T_{c,i}$; 3, a deviation between the time of the binocular camera unit and the time of the inertial measurement unit, expressed as d; 4, the initial pose state of the inertial measurement unit, expressed as $T_{w,i}(t)$; and 5, a bias of an acceleration sensor and a bias of a gyroscope included in the inertial measurement unit; and the like.

The joint calibration process is completed before performing the method provided by the embodiments described above. The joint calibration refers to obtaining the optimal unbiased estimate of each parameter by minimizing the result of the following equation 6 through the Levenberg-Marquardt (LM) algorithm.

$$e_{ymj} = y_{mj} - h(T_{c,i}T_{w,i}(t_j + d)^{-1} p_w^m) \quad \text{Equation 1}$$

$$e_{\alpha k} = \alpha_k - C(\varphi(t_k))^T(at_k - g_w) + b_a(t_k) \quad \text{Equation 2}$$

$$e_{\omega,k} = w_k - C(\varphi(t_k))^T w(t_k) + b_w(t_k) \quad \text{Equation 3}$$

$$J_y = \frac{1}{2}\sum_{j=1}^{J}\sum_{m=1}^{M} e_{ymj}^T R_{ymj}^{-1} e_{ymj} \quad \text{Equation 4}$$

$$J_\alpha = \frac{1}{2}\sum_{k=1}^{K} e_{\alpha_k}^{-1} R_{\alpha_k}^{-1} e_{\alpha_k} \quad \text{Equation 5}$$

$$J_\omega = \frac{1}{2}\sum_{k=1}^{K} e_{\omega_k}^{-1} R_{\omega_k}^{-1} e_{\omega_k} \quad \text{Equation 6}$$

$$J_{b_a} = \frac{1}{2}\int_{t_1}^{t_K} e_{b_a}(\tau)^T Q_a^{-1} e_{b_a}(\tau) d\tau \quad \text{Equation 7}$$

$$J_{\omega_a} = \frac{1}{2}\int_{t_1}^{t_K} e_{b_\omega}(\tau)^T Q_\omega^{-1} e_{b_\omega}(\tau) d\tau \quad \text{Equation 8}$$

$$J = J_y + J_\alpha + J_\omega + J_{b_a} + J_{\omega_a} \quad \text{Equation 9}$$

Where, $y_{mj}$ denotes the pixel coordinates of the feature point $p_w^m$, and $e_{ymj}$ is an error corresponding to $y_{mj}$; $h(T_{c,i}T_{w,i}(t_j+d)^{-1}p_w^m)$ denotes SE3 image coordinate transform; $T_{c,i}$ denotes SE3 transform coordinates between IMU and the camera; $T_{w,i}$ denotes SE3 transform coordinates between world coordinates and the IMU; $t_j$ denotes a displacement between world coordinates and the IMU; d denotes a baseline length; $p_w^m$ denotes the coordinates of a feature point; $C(\varphi(t_k))$ denotes an acceleration at moment of $\varphi(t_k)$; $\alpha_k$ denotes an acceleration; $g_w$ denotes the gravitational acceleration; $b_a(t_k)$ denotes an acceleration bias at moment of $t_k$; $w_k$ denotes an angular velocity; $w(t_k)$ denotes an angular velocity at moment of $t_k$; $b_w(t_k)$ denotes an angular velocity bias at moment of $t_k$; $R_{ymj}^{-1}$ denotes an inverse matrix of the rotation matrix of feature point ymj, $R_{\alpha_k}^{-1}$ denotes an inverse matrix of the rotation matrix of acceleration $\alpha_k$, $e_{b_a}$ denotes an error of the angular velocity bias; $e_{b_\omega}$ denotes an error of the acceleration bias; $e_{b_a}$ denotes an error of the acceleration bias; $e_{b_\omega}$ denotes an error of the angular velocity bias; $Q_a$ denotes a noise density covariance of the acceleration; $Q_w$ denotes a noise density covariance of the angular velocity; $e_{\alpha_k}$ denotes an acceleration error of the acceleration sensor; $e_{wk}$ denotes an acceleration error of the gyroscope; $J_y$ denotes Jacobian matrix of errors between observed landmark points and predicted landmark points; $J_\alpha$ denotes Jacobian matrix of errors between observed accelerations and predicted accelerations; $J_\omega$ denotes Jacobian matrix of errors between observed angular velocities and predicted angular velocities; $J_{b_a}$ denotes Jacobian matrix of acceleration drifting; and $J_{\omega_a}$ denotes Jacobian matrix of angular velocity drifting.

The Levenberg-Marquardt (LM) algorithm is a combination of Gauss-Newton method and steepest descent method, and has the local convergence of the Gauss-Newton method and the global characteristic of the gradient descent method. In particular, the convergence characteristic is achieved by adaptively adjusting the damping factor, providing a higher iterative convergence rate. The calculation process of the LM algorithm is: selecting an initial value to be substituted into the above equations and performing iteration continuously to acquire a globally optimal solution. The globally optimal solution is acquired under an iteration end condition of minimizing the calculation result of the above equation 6.

Figure 6:
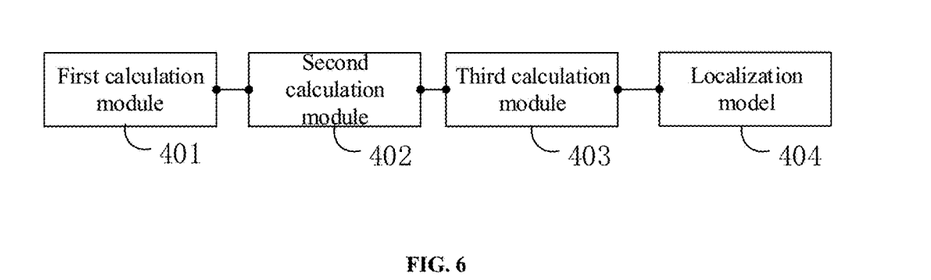
FIG. 6 is a block diagram of a structure of a binocular vision localization device provided by an embodiment of the present disclosure.

FIG. 6 is a block diagram of a structure of a binocular vision localization device provided by an embodiment of the present disclosure. The device comprises a first calculation module 401, a second calculation module 402, a third calculation module 403, and a localization module 404. The first calculation module 401 is configured to calculate first pose change information according to two frames of images collected by a binocular camera unit at two consecutive moments. The second calculation module 402 is configured to calculate second pose change information according to inertial parameters collected by an inertial measurement unit on the binocular camera unit between the two consecutive moments. The third calculation module 403 is configured to extract feature points that are matched in the two frames from the two frames of images respectively, and calculate a reprojection error of each of the feature points. The localization module 404 is configured to acquire third pose change information for localization through optimization calculation using a general graph optimization algorithm that takes the first pose change information and the feature points that are matched in the two frames as nodes of a general graph optimization algorithm, and a difference between the first pose change information and the second pose change information and the reprojection error of each of the feature points as edges of the general graph optimization algorithm.

Further, the first calculation module 401 comprises: an extraction unit, configured to extract a plurality of previous-frame feature points from a previous frame of the two frames of images; a first acquiring unit, configured to acquire coordinate information of the plurality of previous-frame feature points; a searching unit, configured to search for a plurality of next-frame feature points that are respectively matched with the plurality of previous-frame feature points from a next frame of the two frames; a second acquiring unit, configured to acquire coordinate information of the plurality of next-frame feature points; and a calculation unit, configured to calculate a rotation transform matrix and a displacement change vector of the binocular camera unit according to the coordinate information of the plurality of previous-frame feature points and the coordinate information of the plurality of next-frame feature points to acquire the first pose change information.

Further, the first acquiring unit is exemplarily configured to: acquire two-dimensional coordinates of the plurality of previous-frame feature points in a left-eye image and a right-eye image of the previous frame; calculate depth information of the plurality of previous-frame feature points according to the two-dimensional coordinates of the plurality of previous-frame feature points, a focal length of the binocular camera unit and a baseline of the binocular camera unit; and acquire the three-dimensional coordinates of the plurality of previous-frame feature points according to the two-dimensional coordinates and the depth information of the plurality of previous-frame feature points, wherein the coordinate information of the plurality of previous-frame feature points are the three-dimensional coordinates of the plurality of previous-frame feature points in the reference coordinate system.

Further, the localization module in the binocular vision localization device provided by the above embodiments is further configured to: if no next-frame feature points matched with the previous-frame feature points are found from the next frame of the two frames of images, output the second pose change information as the third pose change information for localization, until a plurality of next-frame feature points matched with the plurality of previous-frame feature points are found from the next frame of the two frames of images.

Further, the second calculation module 402 is exemplarily configured to: acquire the second pose change information by performing pre-integration on manifold on the inertial parameters collected by the inertial measurement unit between the two consecutive moments.

Optionally, the inertial parameters include an angular velocity and an acceleration; and the second calculation module 402 is exemplarily configured to: perform pre-integration on manifold on angular velocities collected by the inertial measurement unit between the two consecutive moments to acquire the rotation transform matrix of the inertial measurement unit; and perform pre-integration on manifold on accelerations collected by the inertial measurement unit between the two consecutive moments to acquire the displacement change vector of the inertial measurement unit, wherein the second pose change information comprises: the rotation transform matrix of the inertial measurement unit and the displacement change vector of the inertial measurement unit.

Optionally, the localization module can also acquire position information of the feature points that are matched in the two frames of images and acquire the third pose change information for localization through the optimization calculation using the general graph optimization algorithm simultaneously. Correspondingly, the device further comprises a building module configured to build an environment map according to the position information of the feature points that are matched in the two frames of images.

In the technical solutions provided by the embodiments of the present disclosure, the binocular camera unit and the inertial measurement unit are combined to perform pose estimation, and the inertial measurement unit is introduced to reduce errors of pose estimation only depending on the binocular camera unit. Moreover, when the binocular camera unit moves violently, or when the binocular camera unit is affected by ambient noise, or when the binocular camera unit is located in a region with less texture feature, pose estimation can also be performed based on data collected by the inertial measurement unit, thereby significantly improving the stability, and avoiding the problems of impossible pose estimation and the like due to the binocular camera unit being affected by the environment. In addition, the general graph optimization algorithm is employed to optimize the pose estimation, which effectively reduces the data processing time and improves the real-time performance.

It should be noted here that the binocular vision localization device provided by the above embodiments can implement the technical solutions described in each of the above method embodiments, and the specific implementation principles of the above modules or units may be referred to the corresponding description in the above method embodiments and will not be redundantly described herein.

Figure 7:
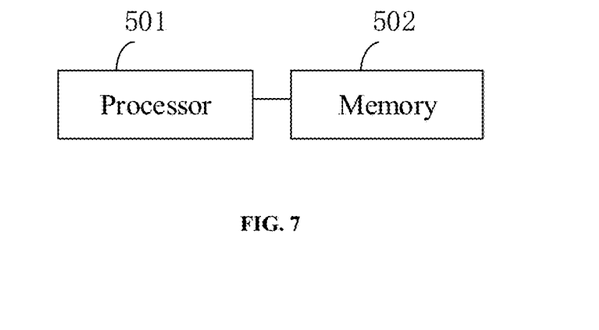
FIG. 7 is a block diagram of a structure of a processor and a memory in a binocular vision localization device provided by another embodiment of the present disclosure.

As shown in FIG. 7, the above device further comprises a processor 501 and a memory 502. The memory 502 is configured to store programs supporting the processor 501 to execute the binocular vision localization method provided by the above embodiments, and the processor 501 is configured to execute the programs stored in the memory 502. The program comprises one or more computer instructions, wherein the one or more computer instructions are used to be invoked and executed by the processor 501. The steps of the above binocular vision localization method can be implemented when the one or more computer instructions are executed by the processor 501. The memory 502, as a non-volatile computer-readable storage medium, can be used to store non-volatile software programs and non-volatile computer-executable programs, such as program instructions corresponding to the binocular vision localization method in the embodiments of the present disclosure. The processor 501 may implement the binocular vision localization method in the above method embodiments by running the non-volatile software programs and instructions stored in the memory 502. The processor 501 is configured to: calculate first pose change information according to two frames of images collected by a binocular camera unit at two consecutive moments; calculate second pose change information according to inertial parameters collected by an inertial measurement unit on the binocular camera unit between the two consecutive moments; extract feature points that are matched in the two frames of images from the two frames of images, respectively, and calculate a reprojection error of each of the feature points; and acquire third pose change information for localization through optimization calculation using the general graph optimization algorithm that takes the first pose change information and the feature points that are matched in the two frames of images as nodes of a general graph optimization algorithm, and a difference between the first pose change information and the second pose change information and the reprojection error of each of the feature points as edges of the general graph optimization algorithm.

The processor 501 may execute the methods provided by the embodiments of the present disclosure, and correspondingly has function modules for executing the method and beneficial advantages. The technical details not fully explained in the present embodiment may referred to the method provided in the embodiments of the present disclosure.

In another embodiment, there is also provided a binocular vision localization system. The system comprises: a binocular camera unit, an inertial measurement unit, and the above binocular vision localization device. The binocular camera unit comprises a left-eye camera and a right-eye camera. The inertial measurement unit is disposed on the binocular camera unit, and the left-eye camera and the right-eye camera are symmetrically located on two sides of the inertial measurement unit. The binocular camera unit and the inertial measurement unit are connected respectively to the device for binocular vision localization.

In the technical solutions provided by the embodiments of the present disclosure, the binocular camera unit and the inertial measurement unit are combined to perform pose estimation, and the inertial measurement unit is introduced to reduce errors of pose estimation only depending on the binocular camera unit. Moreover, when the binocular camera unit moves violently, or when the binocular camera unit is affected by ambient noise, or when the binocular camera unit is located in a region with less texture feature, pose estimation can also be performed based on data collected by the inertial measurement unit, thereby significantly improving the stability, and avoiding the problems of impossible pose estimation and the like due to the binocular camera unit being affected by the environment. In addition, the general graph optimization algorithm is employed to optimize the pose estimation, which effectively reduces the data processing time and improves the real-time performance.

The device embodiments described above are merely illustrative, wherein the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work. From the foregoing descriptions of the embodiments, it will be apparent for a person skilled in the art that each embodiment may be implemented by means of software and necessary general-purpose hardware platform, and certainly, may also be implemented by means of hardware. Based on such an understanding, the above technical solutions, in essence or the part making a contribution to the prior art, may be embodied in the form of a software product that may be stored in a computer-readable storage medium, such as ROM/RAM, magnetic disk, optical disk and the like, including a number of instructions for causing a computer device (which may be a personal computer, a server, or a network device, etc.) to execute the methods of each embodiment or some parts of the embodiments.

Finally, it should be noted that the above embodiments are only meant to illustrate, rather than limit, the technical solutions of the present disclosure. Although the present disclosure is described in detail with reference to the above embodiments, it should be understood by those of ordinary skill in the art that the technical solutions set forth in the above embodiments can still be modified, or part of technical features therein can be equivalently replaced. However, such modifications or replacements do not cause the essence of the corresponding technical solutions to depart from the spirit and the scope of the technical solutions of the embodiments of the present disclosure.

The invention claimed is:

1. A binocular vision localization method, comprising:

calculating first pose change information according to two frames of images collected by a binocular camera unit at two consecutive moments;

calculating second pose change information according to inertial parameters collected by an inertial measurement unit on the binocular camera unit between the two consecutive moments;

extracting feature points that are matched in the two frames of images from the two frames of images respectively, and calculating a reprojection error of each of the feature points;

acquiring third pose change information for localization through an optimization calculation using a general graph optimization algorithm that takes the first pose change information and the feature points that are matched in the two frames of images as nodes of the general graph optimization algorithm, and a difference between the first pose change information and the second pose change information and the reprojection error of each of the feature points as edges of the general graph optimization algorithm; and building an environment map according to position information of the feature points that are matched in the two frames of images obtained by the general graph optimization algorithm.

2. The method of claim 1, wherein said calculating first pose change information according to two frames of images collected by the binocular camera unit at two consecutive moments comprises:
   extracting a plurality of previous-frame feature points from a previous frame of the two frames of images;
   acquiring coordinate information of the plurality of previous-frame feature points;
   searching for a plurality of next-frame feature points that are respectively matched with the plurality of previous-frame feature points from a next frame of the two frames of images;
   acquiring coordinate information of the plurality of next-frame feature points; and
   calculating a rotation transform matrix and a displacement change vector of the binocular camera unit, according to the coordinate information of the plurality of previous-frame feature points and the coordinate information of the plurality of next-frame feature points, to acquire the first pose change information.

3. The method of claim 2, wherein said acquiring coordinate information of the plurality of previous-frame feature points comprises:
   acquiring two-dimensional coordinates of the plurality of previous-frame feature points in a left-eye image and a right-eye image of the previous frame;
   calculating depth information of the plurality of previous-frame feature points according to the two-dimensional coordinates of the plurality of previous-frame feature points, a focal length of the binocular camera unit and a baseline of the binocular camera unit; and
   acquiring three-dimensional coordinates of the plurality of previous-frame feature points according to the two-dimensional coordinates and the depth information of the plurality of previous-frame feature points in the left-eye image and the right-eye image of the previous frame.

4. The method of claim 3, further comprising:
   if no next-frame feature points matched with the previous-frame feature points are found from the next frame of the two frames of images;
   outputting the second pose change information as the third pose change information for localization, until a plurality of next-frame feature points matched with the plurality of previous-frame feature points are found from the next frame of the two frames of images.

5. The method of claim 3, wherein said calculating second pose change information according to the inertial parameters collected by the inertial measurement unit on the binocular camera unit between the two consecutive moments comprises:
   acquiring the second pose change information by performing pre-integration on manifold on the inertial parameters collected by the inertial measurement unit between the two consecutive moments.

6. The method of claim 3, further wherein:
   position information of the feature points that are matched in the two frames of images is acquired while the third pose change information for localization is acquired via the optimization calculation of the general graph optimization algorithm.

7. The method of claim 2, further comprising:
   if no next-frame feature points matched with the previous-frame feature points are found from the next frame of the two frames of images,
   outputting the second pose change information as the third pose change information for localization, until a plurality of next-frame feature points matched with the plurality of previous-frame feature points are found from the next frame of the two frames of images.

8. The method of claim 2, wherein said calculating second pose change information according to the inertial parameters collected by the inertial measurement unit on the binocular camera unit between the two consecutive moments comprises:
   acquiring the second pose change information by performing pre-integration on manifold on the inertial parameters collected by the inertial measurement unit between the two consecutive moments.

9. The method of claim 2, further wherein:
   position information of the feature points that are matched in the two frames of images is acquired while the third pose change information for localization is acquired via the optimization calculation of the general graph optimization algorithm.

10. The method of claim 1, wherein said calculating second pose change information according to inertial parameters collected by the inertial measurement unit on the binocular camera unit between the two consecutive moments comprises:
    acquiring the second pose change information by performing pre-integration on manifold on the inertial parameters collected by the inertial measurement unit between the two consecutive moments.

11. The method of claim 10, further wherein:
    the inertial parameters comprise an angular velocity and an acceleration;
    said acquiring the second pose change information by performing pre-integration on manifold on the inertial parameters collected by the inertial measurement unit between the two consecutive moments comprises:
    performing pre-integration on manifold on the angular velocity collected by the inertial measurement unit between the two consecutive moments to acquire a rotation transform matrix of the inertial measurement unit; and
    performing pre-integration on manifold on the acceleration collected by the inertial measurement unit between the two consecutive moments to acquire a displacement change vector of the inertial measurement unit; and
    the second pose change information comprises: the rotation transform matrix of the inertial measurement unit and the displacement change vector of the inertial measurement unit.

12. The method of claim 1, wherein:
    position information of the feature points that are matched in the two frames of images is acquired while the third pose change information for localization is acquired via the optimization calculation of the general graph optimization algorithm.

13. A binocular vision localization device, comprising:
    a processor, and
    a non-transitory memory storing programs and instructions that, when loaded and executed by the processor, cause the processor to perform:
    calculating first pose change information according to two frames of images collected by a binocular camera unit at two consecutive moments;

calculating second pose change information according to inertial parameters collected by an inertial measurement unit on the binocular camera unit between the two consecutive moments;

extracting feature points that are matched in the two frames of images from the two frames of images, respectively, and calculating a reprojection error of each of the feature points;

acquiring third pose change information for localization via an optimization calculation of a general graph optimization algorithm with the first pose change information and the feature points that are matched in the two frames of images as nodes of the general graph optimization algorithm, and a difference between the first pose change information and the second pose change information and the reprojection error of each of the feature points as edges of the general graph optimization algorithm; and building an environment map according to position information of the feature points that are matched in the two frames of images obtained by the general graph optimization algorithm.

14. The device of claim 13, wherein the processor is further configured to:

extract a plurality of previous-frame feature points from a previous frame of the two frames of images;

acquire coordinate information of the plurality of previous-frame feature points;

search for a plurality of next-frame feature points that are respectively matched with the plurality of previous-frame feature points from a next frame of the two frames of images;

acquire coordinate information of the plurality of next-frame feature points; and calculate a rotation transform matrix and a displacement change vector of the binocular camera unit according to the coordinate information of the plurality of previous-frame feature points and the coordinate information of the plurality of next-frame feature points to acquire the first pose change information.

15. The device of claim 14, wherein the processor is further configured to:

acquire two-dimensional coordinates of the plurality of previous-frame feature points in a left-eye image and a right-eye image of the previous frame;

calculate depth information of the plurality of previous-frame feature points according to the two-dimensional coordinates of the plurality of previous-frame feature points, a focal length of the binocular camera unit and a baseline of the binocular camera unit; and acquire three-dimensional coordinates of the plurality of previous-frame feature points according to the two-dimensional coordinates and the depth information of the plurality of previous-frame feature points in the left-eye image and the right-eye image of the previous frame.

16. The device of claim 14, wherein the processor is further configured to:

if no next-frame feature points matched with the previous-frame feature points are found from the next frame of the two frames of images;

output the second pose change information as the third pose change information for localization, until a plurality of next-frame feature points matched with the plurality of previous-frame feature points are found from the next frame of the two frames of images.

17. The device of claim 13, wherein the processor is further configured to:

acquire the second pose change information by performing pre-integration on manifold on the inertial parameters collected by the inertial measurement unit between the two consecutive moments.

18. The device of claim 17, wherein:

the inertial parameters comprise an angular velocity and an acceleration;

the processor is further configured to:

perform pre-integration on manifold on the angular velocity collected by the inertial measurement unit between the two consecutive moments to acquire a rotation transform matrix of the inertial measurement unit; and perform pre-integration on manifold on the acceleration collected by the inertial measurement unit between the two consecutive moments to acquire a displacement change vector of the inertial measurement unit; and the second pose change information comprises: the rotation transform matrix of the inertial measurement unit and the displacement change vector of the inertial measurement unit.

19. The device of claim 13, wherein:

the processor is further configured to acquire position information of the feature points that are matched in the two frames of images while the third pose change information for localization is acquired via the optimization calculation of the general graph optimization algorithm.

20. A binocular vision localization system, comprising:

a binocular camera unit, an inertial measurement unit, and the binocular vision localization device according to claim 13, wherein:

the binocular camera unit comprises a left-eye camera and a right-eye camera;

the inertial measurement unit is disposed on the binocular camera unit, and the left-eye camera and the right-eye camera are symmetrically located on two sides of the inertial measurement unit; and the binocular camera unit and the inertial measurement unit are connected to the binocular vision localization device, respectively.

* * * * *